US008468088B2

(12) United States Patent
Serio et al.

(10) Patent No.: US 8,468,088 B2
(45) Date of Patent: Jun. 18, 2013

(54) AUTOMATED MINING AND PROCESSING OF DATA ASSOCIATED WITH REAL ESTATE

(75) Inventors: Dianna L. Serio, Irvine, CA (US); Felice J. Kesselring, El Dorado Hills, CA (US)

(73) Assignee: CoreLogic Solutions, LLC, Santa Ana, CA (US)

( * ) Notice: Subject to any disclaimer, the term of this patent is extended or adjusted under 35 U.S.C. 154(b) by 194 days.

(21) Appl. No.: 12/876,581

(22) Filed: Sep. 7, 2010

(65) Prior Publication Data

US 2012/0059756 A1 Mar. 8, 2012

(51) Int. Cl.
*G06Q 40/00* (2012.01)

(52) U.S. Cl.
USPC .............. 705/38; 705/35; 705/39; 705/44

(58) Field of Classification Search
USPC ....................................... 705/35–45
See application file for complete search history.

(56) References Cited

U.S. PATENT DOCUMENTS

| | | | |
|---|---|---|---|
| 7,395,239 B1 | 7/2008 | Riseman | |
| 2001/0037289 A1 | 11/2001 | Mayr et al. | |
| 2002/0107918 A1 | 8/2002 | Shaffer et al. | |
| 2003/0009418 A1* | 1/2003 | Green et al. | 705/38 |
| 2003/0036963 A1 | 2/2003 | Jacobson et al. | |
| 2003/0120591 A1 | 6/2003 | Birkhead et al. | |
| 2006/0149674 A1* | 7/2006 | Cook et al. | 705/44 |
| 2006/0161482 A1* | 7/2006 | Jacobson et al. | 705/26 |
| 2007/0055621 A1 | 3/2007 | Tischler et al. | |
| 2007/0219819 A1* | 9/2007 | Campbell et al. | 705/1 |
| 2009/0234684 A1 | 9/2009 | Stoke et al. | |
| 2011/0173116 A1* | 7/2011 | Yan et al. | 705/38 |

OTHER PUBLICATIONS

"Working Paper: Best Practices for Debtors' Attorneys", Business Lawyer, v64n1, pp. 79-151, American Bar Association, Nov. 2008, ISSN: 0007-6899. Retrieved from Dialog.*
Web pages printed from Public People Finder web site, http://www.publicpeoplefinder.com, on Dec. 28, 2009 (nine printed pages).
Westlaw Research Guide, Asset Records on Westlaw, "Information for Case Valuation and Investigation," Westlaw. Litigator, dated 2005, Material #40453707, pp. 1-12.
3 pages of a User Guide Powerpoint from Westlaw downloaded from: http://1scontent.westlaw.com/research/ppts/Westlaw%20for%20the%20Practitioner%20-%20Public%20Records%20Databases.ppt (undated).
2 page Brochure titled "Assets—LexisNexis Public Records," dated 2008.
Web page titled "Business Background Check and Asset Locator by KnowX," printed from http://www.choicepoint.com/products/knowx.html on Dec. 28, 2009 (one printed page).

(Continued)

*Primary Examiner* — Hai Tran
(74) *Attorney, Agent, or Firm* — Knobbe, Martens, Olson & Bear, LLP

(57) ABSTRACT

Computer-based processes are disclosed for efficiently mining and analyzing information associated with particular mortgage loans, borrowers and properties. The disclosed processes use property-related data aggregated from multiple sources and jurisdictions to, among other tasks, identify properties owned by an individual.

13 Claims, 3 Drawing Sheets

OTHER PUBLICATIONS

Web page titled "LexisNexis Real Property, immediate reports," printed from http://www.choicepoint.com/products/real_property.html on Dec. 28, 2009 (one printed page).

Web page titled "KnowX.com, a LexisNexis Company—Assets Records Search—Verify Owner, Identify Value," printed from https://www.knowx.com/assets/search.jsp on Dec. 28, 2009 (one printed page).

Web page titled "KnowX.com, a LexisNexis Company—Assets Database Info," printed from https://www.knowx.com/assets/description.jsp on Dec. 28, 2009 (2 printed pages).

Web page titled "Locating Assets" printed from http://www.law.csuohio.edu/lawlibrary/resources/lawpubs/publicrecords/assets.html on Dec. 29, 2009 (3 printed pages).

Web page titled "Search by SSN | Social Security Number Search—Find People by Social Security Number," printed from http://www.peoplesearch.info/find_people_by_social_security_number-article.htm on Dec. 28, 2009 (3 printed pages).

Web page titled "NETRonline.com Real Estate Information & Public Records Research," printed from http://www.netronline.com/ on Dec. 28, 2009 (one printed page).

Web page titled "Locate Assets," printed from http://www.proagency.tripod.com/ask8.html on Dec. 29, 2009 (14 printed pages).

Web page titled "Property Reports & People Search Powered by Intelius," printed from http://www.intelius.com/property-check.html on Dec. 28, 2009 (1 printed page).

* cited by examiner

AUTOMATED MINING AND PROCESSING OF DATA ASSOCIATED WITH REAL ESTATE

TECHNICAL FIELD

The present disclosure relates to data processing methods for automatically mining and analyzing information associated with mortgages, property owners, and properties.

BACKGROUND

Financial institutions and other entities involved in the mortgage industry often enter into mortgage-related transactions without accurate ownership data that allows them to properly investigate of the accuracy of representations made by the other entities involved. As one example, a business entity that is considering granting a loan to an individual, or purchasing or investing in such a loan, will typically have access to little or no data to perform an analysis of whether the individual already owns one or more other properties and what their equity positions are. Instead, the business entity may simply rely on a credit report with limited data or the representations of the borrower or, in the case of a securitized loan, the issuer or seller of the loan. As a result, many in the industry have made risky investments that have resulted in significant monetary losses due to decreased profitability or material misrepresentation related to defaulted loans.

SUMMARY

Computer-based processes are disclosed for efficiently mining and analyzing information associated with particular mortgage loans, borrowers and properties. These processes may be incorporated into one or more tools or applications that are accessible via a web site or other interface to lenders, financial institutions, and/or other types of entities. The disclosed processes preferably use property-related data aggregated from multiple sources and jurisdictions to, among other tasks, assess property ownership.

One disclosed process uses information collected from various data sources to automatically identify properties owned by an individual, such as a potential borrower. This process may, as one example, be used by a lender to assess whether a loan applicant has accurately disclosed the real estate properties he or she owns. In one embodiment, multiple databases are initially searched for property addresses corresponding to the name and social security number of the individual. These databases may, for example, include a database of credit header data (provided by one or more of the credit bureaus), and one or more databases of mortgage loan application data. A database of aggregated public recorder data is also used to determine the ownership status of each identified property. In addition, to search for other properties possibly owned by the individual, a search of aggregated public assessor data is conducted to search for other properties for which the mailing address is that of a property owned by the individual.

Another disclosed process uses aggregated data to build a profile of a securitized mortgage loan offered to investors. Typically, the issuer or seller of a securitized loan will only disclose high level information regarding the loan (e.g., the loan amount, loan date, and property zip code) to the potential investors. The issuer or seller will also commonly provide warranties and representations regarding other characteristics of the loan, such as whether the loan is for an owner-occupied property. In one embodiment, the disclosed process uses aggregated public recorder data, and/or other sources of data, to attempt to match the high level loan information to a specific property and borrower. The process also searches for other properties owned by the identified borrower, such as by searching for other properties whose mailing address matches an address associated with the identified borrower. The results of the process may be used to generate one or more reports that can be used by the investors or others to assess the accuracy of the warranties and representations.

Neither this summary nor the following detailed description purports to define the invention. The invention is defined by the claims.

DETAILED DESCRIPTION OF SPECIFIC EMBODIMENTS

Specific, non-limiting embodiments will now be described with reference to the drawings. Nothing in this description is intended to imply that any particular feature, component or step is essential. The inventive subject matter is defined by the claims.

I. System Overview (FIG. 1)

Figure 1:
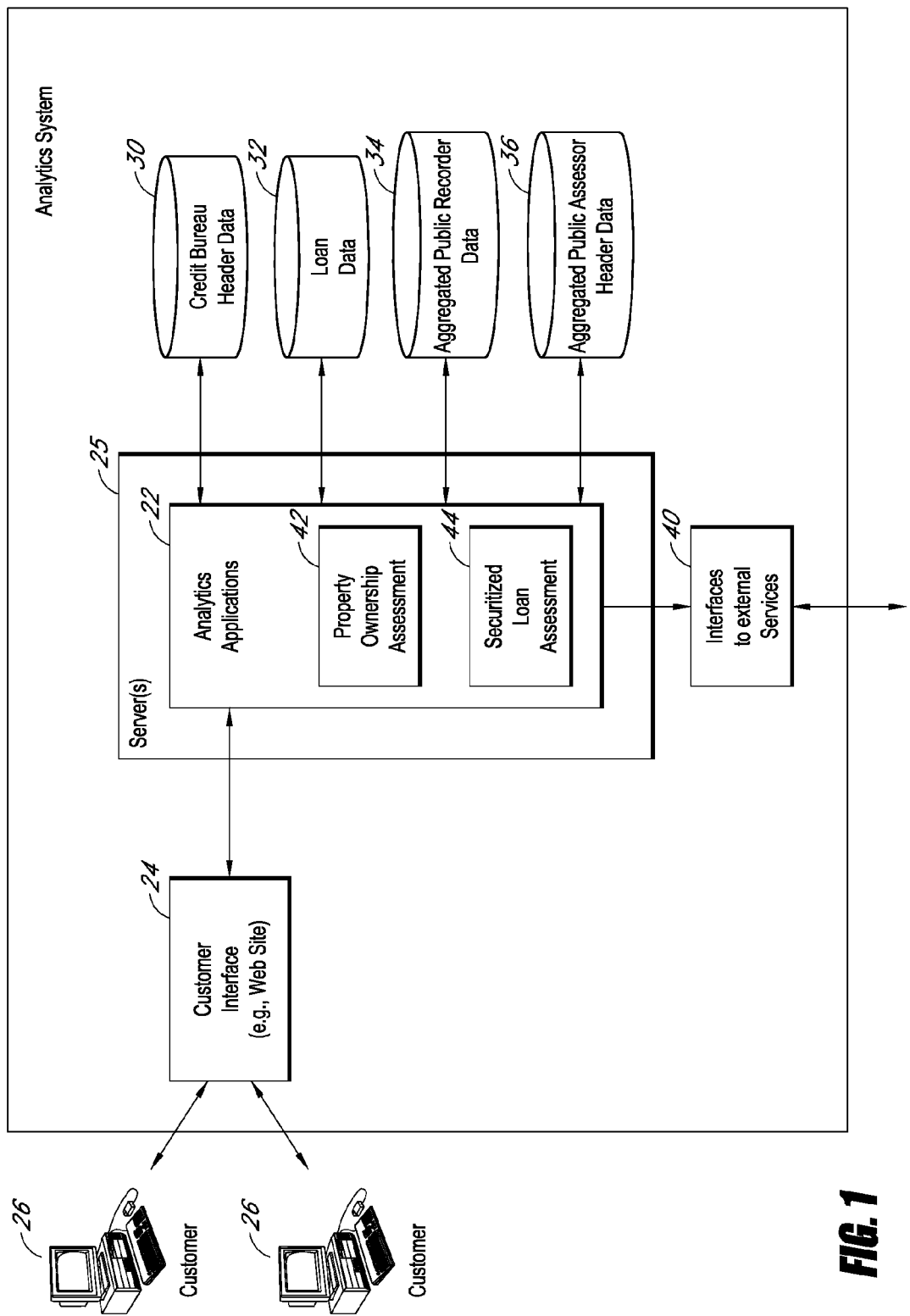
FIG. 1 illustrates components of a computer-based system that provides various applications and services for using aggregated data to perform analytics associated with real estate properties, borrowers and mortgages.

FIG. 1 illustrates an analytics system 20 according to one embodiment. The system may be provided by a business entity or "analytics provider" that provides various services to its customers for assessing risk levels associated with real estate transactions (e.g., mortgages) and other types of transactions. As illustrated, the system includes a set of analytics applications 22 that are accessible over a network (such as the Internet) via a customer interface 24 or through a batched record request delivered via email or an FTP server. The customer interface 24 may, for example, include a web site, an extranet, a web services interface, and/or any other type of interface that enables customers to remotely access and use the applications via their computing devices 26 (desktop computers, mobile phones, servers, etc.). Typical customers of the system 20 include mortgage lenders, other types of lenders, mortgage servicers, real estate investors, and property insurance companies.

As illustrated, analytics applications 22 use a set of data repositories 30-36 to perform various types of analytics tasks, including tasks associated with risk assessments. In the illustrated embodiment, these data repositories 30-36 include a database of credit bureau header data 30, a database of loan data 32 (preferably aggregated/contributed from multiple lenders, as described below), a nationwide database of aggregated public recorder data 34, and a nationwide database of aggregated public assessor (tax roll) data. Although depicted as separate databases, some of these data collections may be merged into a single database or distributed across multiple distinct databases. Further, additional databases containing other types of information may be maintained and used by the analytics applications 22. As shown in FIG. 1, each analytic application 22 runs on one or more physical servers 25 or other computing devices.

The credit bureau header database 30 contains header data obtained from one or more of the U.S. credit bureaus (Experian, Equifax, Transunion, Teletrack, Credco, SafeRent, etc.). As is known in the art, credit header data (also referred to as "credit bureau header data") is the non-financial data commonly included at the top of an individual's credit report. The credit header data for an individual typically includes some or all of the following information regarding the individual: name, social security number, date of birth, current and previous addresses, and AKAs ("also known as" names). The AKAs are based on the name variations in the data reported to the credit bureaus by lenders and/or other institutions. For example, if an individual applies for a loan using the name "Jonathan R. Banks," and later applies for a credit card using the name "John Banks," both variations may show up in individual's credit header data. Credit header data is generally available from the credit bureaus and from data aggregators such as CoreLogic, Merlin, and LexisNexis. Because no trade lines or other credit information is included in the credit header data, the data is not governed by the Fair Credit Reporting Act.

The database of loan data 32 preferably includes aggregated mortgage loan data collected by lenders from mortgage loan applications of borrowers. The analytics provider may obtain the loan application in various ways. For example, lenders and other customers 26 of the analytics system 20 may supply such data to the system 20 in the course of using the analytics applications 22. The customers may supply such data according to an agreement under which the analytics provider and system can persistently store the data and re-use it for generating summarized analytics to provide to the same and/or other customers 26. Such a database is maintained by CoreLogic, Inc. As another example, the analytics provider may obtain such loan data through partnership agreements. As yet another example, the analytics provider may itself be a mortgage lender, in which case the loan data may include data regarding its own loans. Loan data obtained by the analytics provider from lenders is referred to herein as "contributed loan data."

The public recorder database 34 depicted in FIG. 1 contains aggregated data collected from public recorder offices in various counties throughout the United States. This database 34 includes property ownership information, and sales transaction histories with buyer and seller names, obtained from recorded land records (grant deeds, trust deeds, mortgages, other liens, etc.). In one embodiment, the analytics provider maintains this database 34 by purchasing or otherwise obtaining public record documents from most or all of the counties in the United States (from the respective public recorders offices), and by converting those documents (or data obtained from such documents) to a standard format. Such a database is maintained by CoreLogic, Inc. The public recorder database 34 is preferably updated on a daily or near-daily basis so that it closely reflects the current ownership statuses of properties throughout the United States. In one implementation, the database 34 covers 97% of the sales transactions from over 2,535 counties.

The public assessor database 36 shown in FIG. 1 contains aggregated tax roll data, including land files and assessment information, collected from the public assessor offices in various counties throughout the United States. This data includes, among other items, the mailing addresses of record for contacting home owners, for example to mail property tax bills. As explained below, such mailing address data is useful for identifying properties owned by individuals, particularly where such properties are not identifiable from other sources of property ownership data, including Social Security Number based sources. (As used herein, the term "owned" and it's variants is not limited to exclusive ownership.) In one embodiment, the analytics provider maintains the database of public assessor data 36 by purchasing or otherwise obtaining public assessor data from most or all counties (public assessor offices) throughout the United States, and by converting this data into a standard format. In one implementation, the public assessor database 36 covers 99% of properties in the United States, including over 146 million parcels in more than 3,100 counties. Such a database is maintained by CoreLogic, Inc. Property-specific records in the public assessor database 36 are preferably linked with corresponding records in the public recorder database 34, such that the two databases 34 and 36 collectively form a national real estate database containing both recorder and assessor data.

As further shown in FIG. 1, the system 20 may also include one or interfaces 40 to other (externally hosted) services and databases. For example, the system may include APIs or other interfaces for retrieving data from LexisNexis, Merlin, MERS, particular credit bureaus, government agencies, and other types of entities.

As further shown in FIG. 1, the analytics applications 22 include a "property ownership assessment" application or application component 42. As explained in section II below, this application or component 42 uses some or all of the data sources described above to identify real estate properties owned by individuals. Such property ownership information may be used for various risk-assessment-related or due diligence purposes. For example, a mortgage lender may use such information to verify the accuracy of a list of owned properties reported by a loan applicant. As another example, one or more of the analytics applications 22 may use an individual's property ownership information, together with other information regarding the individual, to assess the individual's available home equity for all owned properties, or to assess whether any of the identified properties is the individual's primary residence.

The analytics applications 22 also include a "securitized loan assessment" application or application component 44. As explained in section III below, this application or component 44 uses some or all of the data sources described above to build profiles of securitized loans given high level information provided by the security's issuer or seller. These profiles may be used to check the accuracy of warranties and representations made by the issuer or seller of the securitized loan.

II. Process for Identifying Properties owned by an Individual (FIG. 2)

Figure 2:
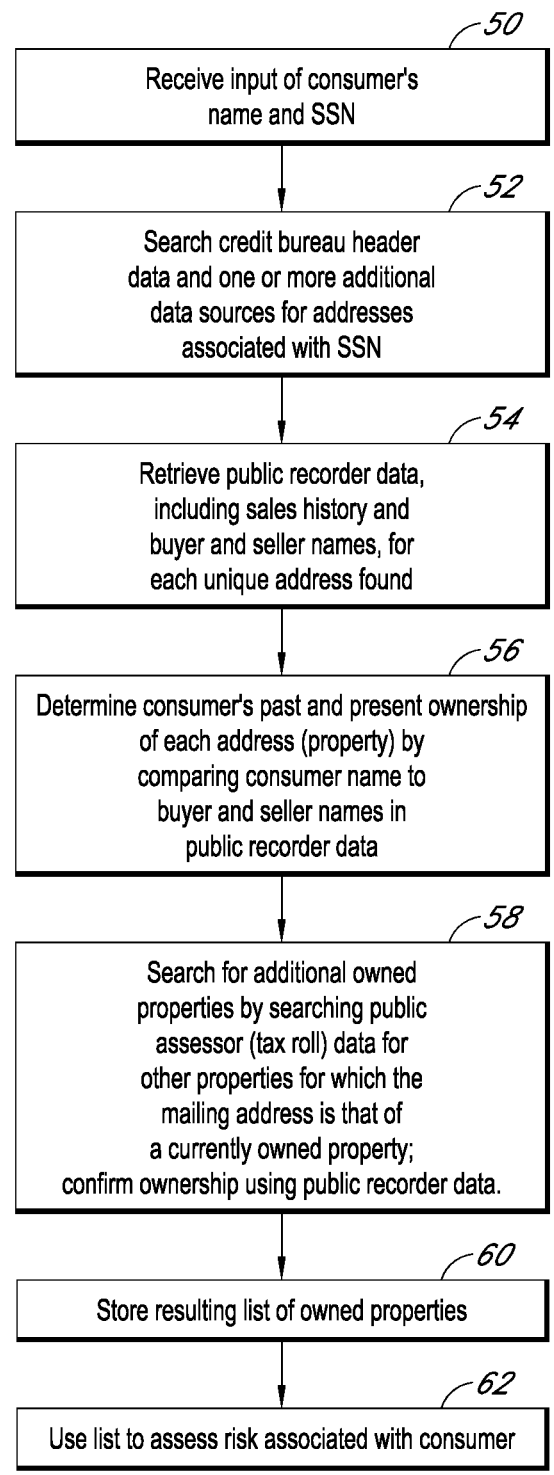
FIG. 2 illustrates an automated process that may be implemented by the system of FIG. 1 to identify properties owned by an individual.

FIG. 2 illustrates one embodiment of an automated process that may be used by the property ownership assessment application or application component 42 (hereinafter "application 42") to identify real estate properties likely owned by an individual. As mentioned above, this process may be useful (as one example) for enabling a lender to verify property ownership information reported by a loan applicant. Typically, the process is used to assess current property ownership; however, the process may also be used to assess property ownership at other points in time.

As depicted by block 50 of FIG. 2, the application 42 initially receives the name and social security number (SSN) of an individual, as submitted by a customer 26 via the customer interface 24. The customer 26 may submit the name and social security number via a web page, a web services call, a mobile application, or any other appropriate interface.

The submission may either be manual (e.g., a user submits a web form) or automated (e.g., a customer's computer system generates a web service call).

As shown in block 52 of FIG. 2, the application 42 then conducts a search for addresses associated with the received social security number. In the preferred embodiment, this task includes a search of the database of credit bureau header data 30 (FIG. 1). The credit header data is useful for identifying known addresses of the individual used to apply for credit. However, it is generally not useful for identifying ownership of the known addresses or other properties owned by the individual and not reported on the credit report. For example, if an individual legitimately applies for a loan for a vacation home using the individual's primary residence address, the information reported to the credit bureaus ordinarily will not include the address of the vacation home. The credit header data can also be deficient for other reasons, such as reporting anomalies, if the owner does not apply for any credit related to a new home purchase, or if the loan is acquired through non-conventional means such as private party lenders.

To address these deficiencies in the credit header data, one or more additional data sources are preferably included in the scope of the search in block 52. The one or more additional data sources may, for example, include the database of loan data 32 (FIG. 1), and/or the MERS® (Mortgage Electronic Registration Systems) Loan Registry maintained by MERSCORP, Inc. As is known in the art, the MERS Loan Registry contains information regarding loans registered by a variety of mortgage lenders. Because registration is optional, the registry does not contain information regarding all mortgages throughout the country. By searching one or both of these additional data sources (i.e., a database of aggregated loan data 32 and/or the MERS registry), the process significantly increases the likelihood that vacation homes and investment properties will be identified in this step 52. In some embodiments, data retrieved from the MERS registry may be cached or persistently stored by the analytics system 20 so that it may be searched locally.

As will be apparent, data sources other than those identified above may additionally or alternatively be used to conduct the search in block 52. For example, publicly aggregated bankruptcy or tax lien records can be used to obtain address information for the individual. Thus, the particular types of data sources discussed above are not critical.

The result of step 52 is a list of addresses associated with the individual's social security number, as determined (preferably) from credit header data and one or more sources of loan data aggregated across multiple lenders. If any duplicates exist in the list (as the result in overlap between the searched databases), they are reduced to a single entry. The following is an example of such a list prior to de-duplication, with revisions to the actual addresses to protect privacy.

The "source" column specifies the source of each entry: credit header data, contributed loan data, or MERS registry. In this example, entries 5-8 are duplicates of other entries, and can therefore be eliminated. Additionally, PO Box addresses are eliminated at this point as well. As reflected by the "ownership" column, the ownership of the properties has not yet been determined at this stage of the process. In the present embodiment, this step is especially useful for locating additional addresses associated to an individual that were not already included in their credit history (credit header data). For example, the property at 3100 Palm Dr. would not have been associated to the individual if aggregated loan application data had not been added as an additional address query.

As depicted by blocks 54 and 56 of FIG. 2, the next two steps of the process involve retrieving the public recorder data for each address from the national (aggregated) public recorder database 34 (FIG. 1), and using this data to assess whether the subject individual currently owns each property. The public recorder data for each address typically includes all sales history transactions. The transaction data ordinarily includes the following information for each sale: date, transfer type (e.g., resale, refinance, etc.), the dollar value of the transaction, the loan amount, and the buyer, borrower and the seller name(s).

To determine the current or past ownership status of each property, the individual's name and AKAs, as received in step 50, are compared to the buyer (or borrower) and seller names included in the retrieved transaction data for each property. A conventional and/or proprietary name matching algorithm may be used for this purpose, and will account for minor name variations (e.g., Steve versus Stephen, etc.). In one embodiment, a conventional name matching algorithm, such as the Jaro-Winkler algorithm, measures the weighted sum or percentage of matched characters in a name. In addition, data cleansing is performed (to remove titles such as "MR" or "MRS", etc), and names are compared in different order to handle first and last name swaps in input data. The results of block 56 are shown below for the example scenario described above.

| No. | Address | Ownership |
|---|---|---|
| 1 | 320 STONE RD, CHESAPEAKE, VA 23322 | Current |
| 2 | 617 ROSE CIR, VIRGINIA BEACH, VA 23464 | Current |
| 3 | 3100 PALM DR, VIRGINIA BEACH, VA 23456 | Past |
| 4 | 930 WOODCREEK AVE #B1, NORFOLK, VA 23517-1732 | Past |

In block 58 of FIG. 2, a search is conducted of the public assessor (tax roll) database 36 (FIG. 1) for any additional properties whose mailing address matches the address of a

| No. | Address | Source | Ownership |
|---|---|---|---|
| 1 | 320 STONE RD, CHESAPEAKE, VA 23322 | Credit header | unknown |
| 2 | 617 ROSE CIR, VIRGINIA BEACH, VA 23464 | Credit header | unknown |
| 3 | 3100 PALM DR, VIRGINIA BEACH, VA 23456 | Contr. loan data | unknown |
| 4 | 930 WOODCREEK AVE #B1, NORFOLK, VA 23517-1732 | Credit Header | unknown |
| 5 | 320 STONE RD, CHESAPEAKE, VA 23322-4345 | Contr. loan data | unknown |
| 6 | 617 ROSE CIR, VIRGINIA BEACH, VA 23464-4219 | Credit header | unknown |
| 7 | 320 STONE RD, CHESAPEAKE, VA 23322 | MERS | unknown |
| 8 | 617 ROSE CIR, VIRGINIA BEACH, VA 23464-4219 | Contr. loan data | unknown |
| 9 | 123 PO BOX, SAINT MICHAELS, MD 21663 | Credit header | unknown | currently-owned property. In the example above, this would involve searching the aggregated public assessor data for additional properties whose mailing address (for sending tax bills and notices) is either the 320 Stone Road address or the 617 Rose Circle address. In the present embodiment, this step is especially useful for locating owned properties for which the individual did not obtain a loan. For example, if the individual paid cash for a small vacation home, this property likely will not show up in the credit header data or loan data (including MERS); however, assuming the tax bill for this vacation home is sent to the individual's primary residence, the vacation home can be identified from the public assessor data. The mailing address search of the aggregated public assessor data 36 is also useful for locating owned properties that are missing from the credit header data and loan data for other reasons.

If any additional properties are located via this mailing address search of block 58, the public recorder data for each such property is retrieved and is used to confirm the individual's ownership. As in block 56, this involves comparing the individual's name (preferably using a name matching algorithm) to the buyer (or borrower) and seller names listed in the property's transaction history as maintained by the relevant public recorder. If an additional owned property is identified, step 58 may optionally be repeated to search for other properties whose mailing address matches that of this newly identified property. In other words, multiple iterations of step 58 may be executed.

The following table illustrates the results of step 58 for the example scenario. In this example, entry 5 is an additional property located in the mailing address search. The individual's ownership of this property was confirmed from the public recorder data for this property.

| No. | Address | Ownership |
|---|---|---|
| 1 | 320 STONE RD, CHESAPEAKE, VA 23322 | Current |
| 2 | 617 ROSE CIR, VIRGINIA BEACH, VA 23464 | Current |
| 3 | 3100 PALM DR, VIRGINIA BEACH, VA 23456 | Past |
| 4 | 930 WOODCREEK AVE #B1, NORFOLK, VA 23517-1732 | Past |
| 5 | 632 WHITE ROCK RD, VIRGINIA BEACH, VA 23464 | Current |

As will be apparent, the mailing address search of block 58 can additionally or alternatively be performed using other sources of mailing address information. For example, reverse phone data queries or data provided by rental data aggregators could be used as supplemental or alternate mailing address sources.

As depicted in block 60, the resulting list of owned properties (three in the above example), together with an indication of the source of each address (e.g., "credit header data" or "public assessor mailing address search"), is stored in computer storage in association with the received name and social security number for subsequent use. This information may also be output for display to the customer 26 via the customer interface 24 together with information about the owned properties.

As depicted by block 62, the "owned properties" list may also be used as an input to other analytics applications 22. For example, an owner occupancy application 22 may analyze the characteristics of each property (e.g., homeowners and tax exemptions, whether the mailing address matches the property address, etc.) to identify the property most likely occupied by the individual. As another example, the total number and dollar amount of the liens on the owned properties may be compared to the property value and used to assess a risk level associated with the individual.

Figure 3:
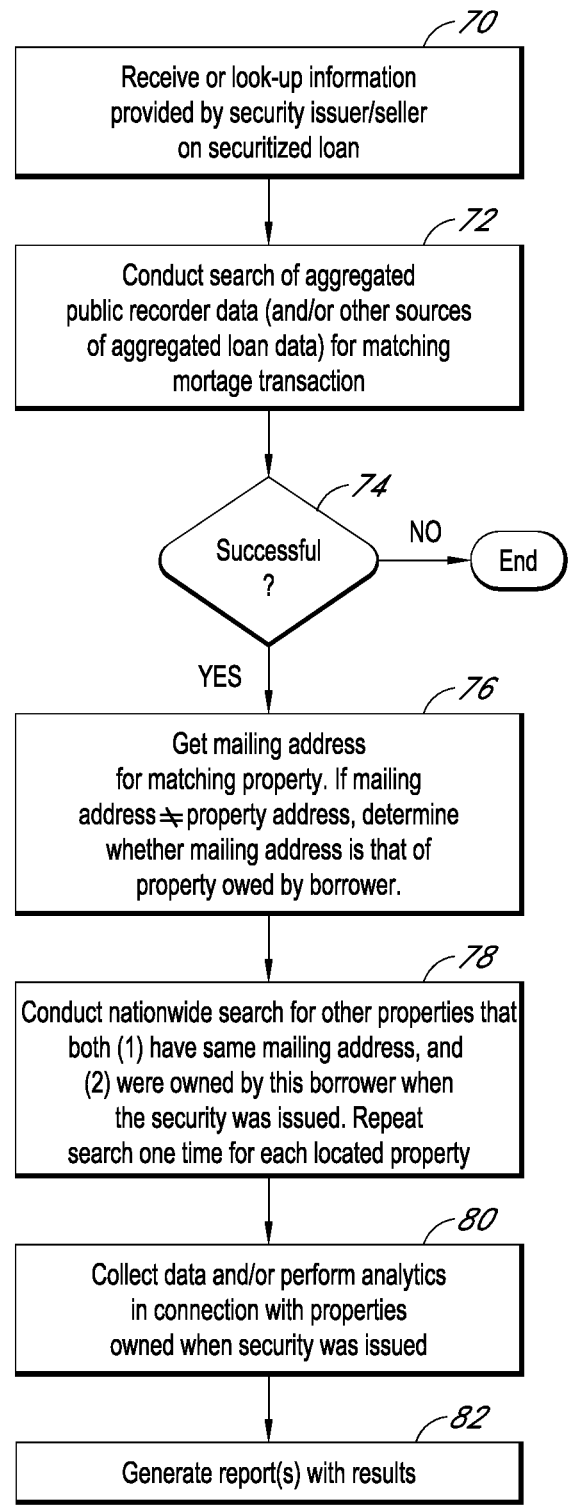
FIG. 3 illustrates an automated process that may be implemented by the system of FIG. 1 to generate a profile of a securitized loan given high level information provided by a security issuer or seller.

III. Process for Assessing Securitized Loans (FIG. 3)

An automated process will now be described for determining information regarding securitized loans, including the identities of the borrowers, and the addresses of any properties own by these borrowers. As mentioned above, this process may be embodied in a "securitized loan assessment/due diligence" application or application component 44 (hereinafter "application 44") that provides tools and reports for assisting customers in assessing securitized loans and the associated warranties and representations.

By way of background, when a mortgage loan or group of mortgage loans is made available to investors as a security (e.g., a bond), the issuer or seller of the security typically does not provide the investors with the property addresses and borrower names associated with the loan(s). Instead, the security issuer or seller typically provides the investors with generalized information about each loan, typically via a prospectus. This generalized information typically includes the loan amount, zip code, and loan date, and may also include other details such as the lender name and/or sales price. The issuer also ordinarily provides warranties and representations to the investors regarding other characteristics of the securitized loan(s). The following are examples of the types of warranties and representations that may be provided in connection with a security that includes multiple loans: (1) all (or a specified minimum percentage) of the loans are for owner-occupied properties; (2) all of the borrowers have FICO scores between X and Y, (3) all of the loans have loan-to-value ratios falling in the range of X to Y.

In recent years, securities investors have realized severe losses in connection with their investments in securitized loans. In some cases, the investors can recoup such losses by establishing that the warranties and representations associated with the security were materially false. For example, for a group of loans represented as "at least 80% owner occupied," the investor may be able to show that significantly less than 80% of the loans actually involved owner-occupied properties.

The first step in assessing whether the securitized loan was misrepresented is to identify the property and borrower associated with the loan, to assess the specifics of the borrower, and to identify any other properties owned concurrently by that borrower at the time the security was offered. FIG. 3 illustrates an innovative process for performing this task using some or all of the information sources described in section I above. For purposes of illustration, this process will be described in the context of an investment that has already been made. As will be apparent, the process may be used at other points in time and for other purposes; for example, it may be used to evaluate whether to invest in the security. Where the security includes multiple loans, the process shown in FIG. 3 may be repeated for each loan.

As illustrated in block 70 of FIG. 3, the application 44 initially receives or looks up the general information provided by the issuer or seller of the security regarding the securitized loan. As mentioned above, this generalized information typically includes the loan date, the loan amount, and the zip code associated with the loan. The customer 26 may supply this information directly (via the customer interface 24 shown in FIG. 1), or may supply a CUSIP (Committee on Uniform Securities Identification Procedures) number or deal name that can be used to look up this information. This information may alternatively be obtained from an existing database.

In block 72, the application performs a search of the aggregated public recorder data 34 (FIG. 1), and/or other data sources such as contributed loan data 32, for a mortgage transaction that matches the loan date, loan amount and zip code. As explained above, the public recorder database 34 includes data regarding public documents, including mortgage documents and grant deeds, recorded by the public recorder offices of most or all counties in the United States. For mortgages, this information includes the borrower name, property address, loan date, loan amount, sales price, lender, and various other items of information.

If a single match is found in block 72, the borrower name and property address are obtained from the matching mortgage transaction record or grant deed. In one embodiment, if the process does not find a matching mortgage transaction, it searches for a matching grant deed from which to obtain this information. The grant deed will typically include information about the associated transaction, including the property and mailing address and the recording date. If multiple matches are found in block 72, additional information about the securitized loan, if provided by the issuer or seller, may be used to attempt to resolve the search to a single mortgage transaction and property. For example, if the information from the security issuer identifies the lender or sales price associated with the securitized loan, one or both of these pieces of information may be used to select one of the matching mortgage transactions.

As depicted by block 74 of FIG. 3, if the search is unsuccessful (i.e., the search did not result in a single matching mortgage transaction), the process ends. Otherwise, in block 76, the process determines the mailing address for the identified property. The mailing address may be obtained from the matching mortgage transaction record or grant deed, and/or from the database of aggregated public assessor data 36 (FIG. 1). The mailing address may differ from the property address if, for example, the borrower purchased the property as a vacation home or a property to rent out. Thus, as indicated in block 76, if the two addresses are not the same, a determination is made (based on transaction history data stored in the public recorder database 34 for the mailing address) whether the mailing address is that of a property owned by the borrower during the relevant time period.

In block 78 of FIG. 3, a nationwide search is then conducted for other properties with that both (1) had the same mailing address, and (2) were owned by this borrower, as of the origination date of the securitized loan. Both the aggregated public recorder data and the aggregated public assessor data are preferably included in the scope of this search. The purpose of this search is to identify any other properties that were owned by the borrower during the relevant time period. For example, suppose steps 72 and 76 reveal that the securitized loan is for property A, for which the borrower received tax bills at property B. A search would be conducted for other properties for which the borrower has received tax bills at the address of property B. Suppose further that this mailing address search reveals that the borrower received tax bills at property B for property C. A determination would then be made, based on the transaction history data for property C as obtained from the public recorder database 34, whether the borrower owned property C during the relevant time period.

As an alternative or supplement to the nationwide search of block 78, a search may be conducted for the borrower Social Security Number (SSN) associated with the securitized loan; if this search is successful, the SSN-based process of FIG. 2 may then be used to identify the additional owned properties. The search for the SSN may be performed by (1) searching a loan application database for a record of a loan that matches the loan date, loan amount, and property address associated with the securitized loan, and (2) if a matching loan record is found, obtaining the SSN from this record.

As indicated in block 78, if the mailing address search reveals one or more additional owned properties, a second pass of the search is preferably performed in an attempt to locate additional owned properties. For instance, continuing the example above, if the borrower is determined to have owned property C, a second-pass search would be performed for additional properties (other than A, B and C) for which the borrower received tax bills at property C. If, for example, this second-pass search reveals that the borrower received tax bills for property D at property C, the recorded transaction history of property D would be used to determine whether the borrower owned property D during the relevant time period. The second pass of the search may alternatively be omitted, or may be supplemented with one or more additional passes.

In block 80, additional data regarding the located property or properties (and possibly the borrower) may be collected from various sources and used to perform one or more types of analytics. For example, if the borrower concurrently owned two or more properties when the securitized loan was issued, the application 44 (or a different analytics application) may determine which, if any, of these properties was most likely the primary residence of the borrower. This determination may be made based on various criteria, such as (1) whether the mailing and property addresses match, and (2) the tax and homeowners exemptions associated with the properties.

Finally, in block 82, the results of the preceding steps are incorporated into one or more electronic reports that can be used, among other purposes, to assess whether the warranties and representations associated with the securitized loan were accurate. For example, if multiple concurrently-owned properties were found, a concurrent ownership report may be generated; this report may, for example, include the following and other types of information for each owned property: address, purchase and sale dates to/from the borrower, sale prices, whether the property likely served as the borrower's primary residence, property value, square footage, mortgage details, loan-to-value ratio, number and dollar amount of any liens, and tax exemption status. The generated report or reports may also include information, including the borrower's FICO score at the security origination date, and the amount of any valuation misrepresentation. In some cases, the auto-generated reports may be manually reviewed and modified by human personnel before they are made available to the customer.

In some use cases, the customer/user 26 of the analytics system may already know the details of the loan or loans at issue, and may be able to provide such details to the system. In these scenarios, the matching process of blocks 72 and 74 of FIG. 3 may be skipped.

As will be apparent, the process shown in FIG. 3 can be modified to incorporate steps of the process shown in FIG. 2, and vice versa. For example, some or all of the steps shown in FIG. 2 for locating owned properties can be incorporated into the process of FIG. 3, either in addition to or in place of steps 76 and 78. Similarly, steps 76 and 76 could be incorporated into the process of FIG. 2, either in addition to or in place of step 58. Further, the steps shown in FIGS. 2 and 3 need not be performed in the order shown, and some steps may be performed concurrently with others.

IV. Conclusion

All of the processes and process steps described above (including those of FIGS. 2 and 3) may be embodied in, and fully automated via, software code modules executed by one or more general purpose computers, servers, or other types of computing machines. The code modules may be stored in any type of non-transitory computer-readable medium or other computer storage or storage device. Some or all of the methods or steps may alternatively be embodied in specialized computer hardware. The results of the disclosed methods and tasks may be persistently stored by transforming physical storage devices, such as solid state memory chips and/or magnetic disks, into a different state.

Thus, all of the methods and tasks described herein may be performed and fully automated by a programmed or specially configured computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located.

With further reference to FIG. 1, the customer interface 24 and the interfaces 40 to the external services may be hosted on one or more servers, which may, but need not, be the same as those 25 that host the analytics applications 25. The databases 30-36 may reside on the server or servers 25 that host the analytics applications 25 and/or on other machines.

Components and functions of the analytics system 20 that are not important to an understanding of the inventive subject matter are omitted from the drawings. For example, the analytics system 20 may also include components for handling such tasks as authenticating customers 26, charging customers for services, and otherwise managing customer accounts.

The foregoing description is intended to illustrate, and not limit, the inventive subject matter. The scope of protection is defined by the claims. In the following claims, any reference characters are provided for convenience of description only, and not to imply that the associated steps must be performed in a particular order.

What is claimed is:

1. An analytics system, comprising:
    a data repository of public recorder data aggregated across multiple public recorders of multiple respective jurisdictions;
    a data repository of public assessor data aggregated across multiple public assessors of multiple respective jurisdictions; and
    a computing system programmed to generate a profile of a securitized loan by at least:
        (a) searching the public recorder data for a mortgage transaction that matches a loan amount, loan date, and property zip code associated with the securitized loan;
        (b) determining a borrower name and property address associated with the securitized loan based on a matching mortgage transaction identified in said search of the public recorder data, said property address being that of a property purchased by the borrower using the securitized loan;
        (c) determining a mailing address associated with said property; and
        (d) searching at least the public assessor data for additional properties whose mailing address matches the mailing address identified in (c), to thereby search for additional properties owned by said borrower.

2. The analytics system of claim 1, wherein the computing system is additionally programmed to use the public recorder data to determine whether the mailing address determined in (c) is that of an additional property owned by the borrower.

3. The analytics system of claim 1, wherein the computing system is additionally programmed to generate a concurrent ownership report that identifies a plurality of properties determined via (a)-(d) to be owned by said borrower.

4. A computer-implemented method of searching for properties owned by an individual, comprising:
    determining a first property address of a first property associated with the individual;
    conducting a mailing address search of aggregated public assessor data to locate a second property whose mailing address matches said first property address;
    retrieving, from a data repository of public recorder data, sales transaction history data associated with the second property;
    performing a comparison of at least one name associated with the individual to names included in the sales transaction history data associated with the second property; and
    determining, based on said comparison, whether the second property has been purchased by the individual;
    said method performed by a system that comprises one or more computers.

5. The method of claim 4, wherein the method comprises determining the first property address from credit header data associated with the individual.

6. The method of claim 4, wherein the method comprises determining the first property address by using a name and social security number of the individual to search aggregated loan data for a mortgage loan provided to said individual.

7. The method of claim 4, wherein determining the first property address comprises looking up the mailing address associated with a third property owned by the individual.

8. The method of claim 4, wherein performing said comparison comprises using a name matching algorithm that accounts for name variations to compare a name associated with the individual to names included in the sales transaction history data.

9. Non-transitory computer storage having stored thereon executable code that directs a computer system comprising one or more computing devices to search for properties owned by an individual by at least:
    determining a first property address of a first property associated with the individual;
    conducting a mailing address search of aggregated public assessor data to locate a second property whose mailing address matches said first property address;
    retrieving, from a data repository of public recorder data, sales transaction history data associated with the second property;
    performing a comparison of at least one name associated with the individual to names included in the sales transaction history data associated with the second property; and
    determining, based on said comparison, whether the second property has been purchased by the individual.

10. The non-transitory computer storage of claim 9, wherein the executable code directs the computer system to determine the first property address from credit header data associated with the individual.

11. The non-transitory computer storage of claim 9, wherein the executable code directs the computer system to determine the first property address by using a name and social security number of the individual to search aggregated loan data for a mortgage loan provided to said individual.

12. The non-transitory computer storage of claim 9, wherein determining the first property address comprises looking up the mailing address associated with a third property owned by the individual.

13. The non-transitory computer storage of claim 9, wherein performing said comparison comprises using a name matching algorithm that accounts for name variations to compare a name associated with the individual to names included in the sales transaction history data.

* * * * *